United States Patent [19]
Kirstein

[11] Patent Number: 5,086,395
[45] Date of Patent: Feb. 4, 1992

[54] SAFETY DEVICE OF AN ELECTRIC CONTROL OR REGULATING SYSTEM FOR A GEARSHIFT MECHANISM, WHICH CONTAINS AT LEAST ONE ELECTROMAGNETIC CONTROL ELEMENT

[75] Inventor: Gerhard Kirstein, Augsburg, Fed. Rep. of Germany

[73] Assignee: Renk Aktiengesellshaft, Augusburgl, Fed. Rep. of Germany

[21] Appl. No.: 470,876

[22] Filed: Jan. 25, 1990

[30] Foreign Application Priority Data
Jan. 25, 1989 [DE] Fed. Rep. of Germany ....... 3902037

[51] Int. Cl.⁵ .......................................... B60K 41/08
[52] U.S. Cl. .................................. 364/424.1; 74/866
[58] Field of Search ...................... 364/424.1; 74/866; 324/158 R

[56] References Cited

U.S. PATENT DOCUMENTS

| | | | |
|---|---|---|---|
| 4,635,508 | 1/1987 | Tatsumi | 364/424.1 |
| 4,661,772 | 4/1987 | Kirstein | 324/158 R |
| 4,855,913 | 8/1989 | Brekkestran et al. | 364/424.1 |
| 4,892,014 | 1/1990 | Morell et al. | 74/866 |
| 4,913,004 | 4/1990 | Panoushek et al. | 364/424.1 |

*Primary Exan.iner*—Salvatore Cangialosi
*Attorney, Agent, or Firm*—Darby & Darby

[57] ABSTRACT

An electrical safety device of an electrical control or regulating system of a gear shifting mechanism, includes a microcomputer, a pulse processor with an integrated watchdog timer and an integrated analog/digital converter, a retriggerable monoflop, a noninverting power amplifier, an inverting power amplifier and a Schmitt trigger in each of the response lines from a positive voltage output and a negative voltage output of the power amplifiers to the microcomputer. This enables an electromagnetic control element of a gear shifting mechanism to be supplied with a monitored positive voltage as well as with a monitored negative voltage.

5 Claims, 1 Drawing Sheet

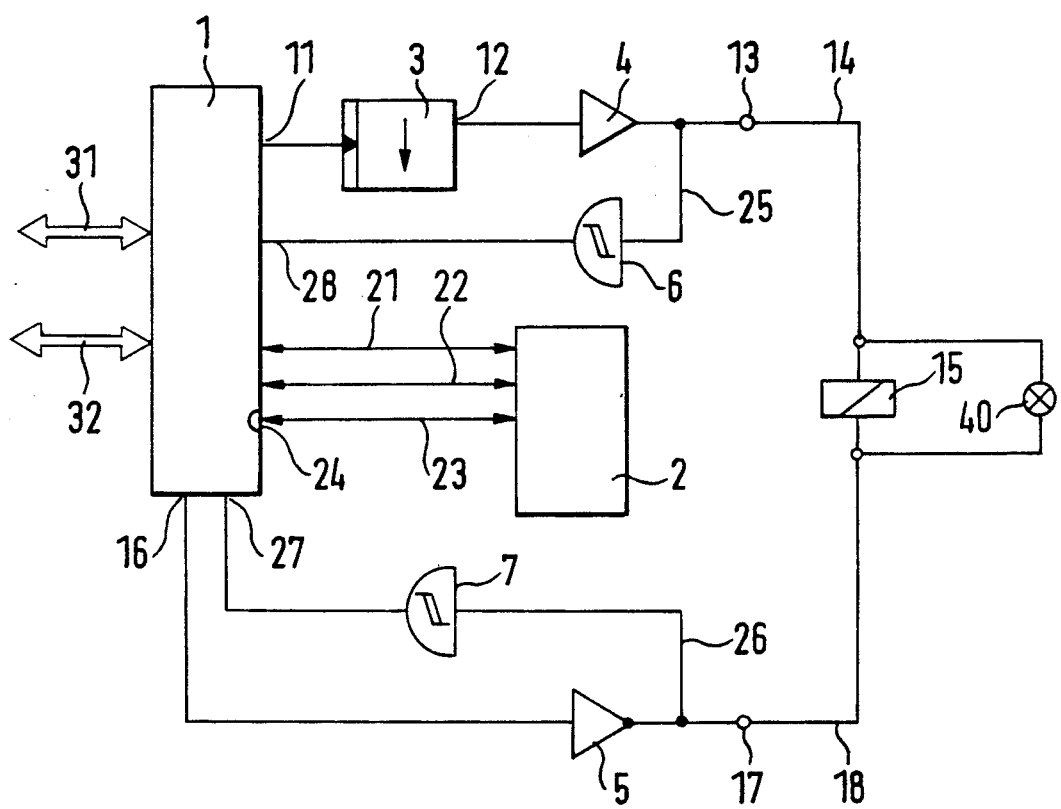

SAFETY DEVICE OF AN ELECTRIC CONTROL OR REGULATING SYSTEM FOR A GEARSHIFT MECHANISM, WHICH CONTAINS AT LEAST ONE ELECTROMAGNETIC CONTROL ELEMENT

BACKGROUND INFORMATION AND PRIOR ART

1. Field of Invention

The invention relates to a safety device for an electric control or regulating system for a gearshift mechanism which contains at least one electromagnetic control element.

2. Description of the Prior Art

German Patent 34 05 289, which corresponds to U.S. Pat. No. 4,661,772, issued to the inventor herein, discloses an electric measuring and testing circuit for a control system of a gearshift mechanism. A control system for a gearshift mechanism is disclosed in German Patent 35 06 849.

Electrically actuated magnets, so-called gearshift magnets, are provided to change the gears in gear shifting mechanisms of a known type. Moreover, a mechanical shifter has heretofore been provided for each gear, and thus also for each shift magnet. If a gear magnet was supplied with current, the mechanical shifter for this gear magnet mechanically changed the mechanical shifter of the previously engaged shift magnet such that only that gear was engaged, the shift magnet of which was last energized. The individual gears therefore have always been changed "mechanically" by the shifter. Each gear had a shifter. The shifter of the new gear automatically unlocked the shifter of the old gear and pushed it aside and locked in the newly engaged gear.

In this way it was assured that in all cases only the shift clutch of the last gear engaged was actuated, but never a plurality of clutches of a plurality of gears simultaneously.

In another known type of gearshift mechanism, when shifting from one gear to another, the clutches for the two gears are engaged "overlappingly", such that the clutches of the two gears are actuated simultaneously during a shift period. Both clutches slip simultaneously and thus both take over part of the job of synchronization for the gearshift. At the same time, the engaging pressure of the friction surfaces in the two clutches must be so controlled that, after a certain slippage period, during which both clutches are slipping, the clutch of the previous gear is fully opened and the clutch of the newly engaged gear is completely closed, that is, one clutch is opened so far, that it no longer slips, and the other clutch is closed with such a strong pressure that it no longer slips. At the same time, it is necessary that the clutches do slip simultaneously during a shift period, yet never must both be closed simultaneously so fully that they no longer slip, but are closed so as to block without slippage.

For this kind of "overlapping" gear change with simultaneously slipping clutches for several gears, the above-mentioned mechanical shifters can no longer be used, since they would prevent this kind of overlapping gear change. The mechanical shifters, however, have the advantage that, in the event of a power failure, the last-engaged gear continues to be engaged, and that, in the event of an electrical short circuit, a plurality of gears will not become engaged simultaneously, which would lead to a breakdown of the gear shifting mechanism. The problems therefore faced by the newly developed transmissions with "overlapping" engagement are as follows:

1. How can the last-engaged gear be kept engaged in the event of an electrical power failure, and
2. How can it be assured, in the case of an electrical short circuit or other defect, that two or more gears will not become engaged simultaneously and thus cause transmission damage?

This means that an "overlapping slippage" of the clutches would be desired in the new gear shifting mechanism, but not the complete and simultaneous closing of the clutches of two or more gears. Also, in the case of a defect, such as an electrical voltage drop or an electrical short circuit, the disadvantages described above should be avoided. The mechanical shifters of the state of the art do permit an "overlapping slippage" of the clutches of successively engaged gears, but only insofar as production tolerances allow it and as a result of the flow time of the actuating oil. However, they do not permit a controlled overlapping slippage of the clutches for a specific slippage period. Pursuant to the invention, the duration of the gear changing process and the period of common slippage of the clutches can be made dependent on the torque that is to be transferred.

SUMMARY OF THE INVENTION

It is an object of the invention to provide a safety device of an electrical control or regulating system for a gear shifting mechanism which contains at least one electromagnetic control element.

It is a further object to ensure that the last-engaged gear of such a gear shifting mechanism is kept engaged, even in the event of a decrease in the electric voltage supplied to the electromagnetic control element, and that the clutches of several gears are not simultaneously and inadvertently closed completely, for example, in the event of an electrical short circuit in the control or regulating system.

A safety device for an electrical control or regulating system for a gear shifting mechanism, including at least one electromagnetic control element, which device comprises a microcomputer, a noninverting power amplifier connected, via a retriggerable monoflop, to a first output of the microcomputer and an inverting power amplifier connected to a second output of the microcomputer. A pulse processor is connected to the microcomputer with address lines and data lines. Each of the address and data lines is adapted for the bidirectional flow of signals. The pulse processor is additionally connected, via an interrupt request line, to an interrupt request input of the microcomputer. The pulse processor includes a watchdog timer means for monitoring the function of the microcomputer. The microcomputer generates voltage pulses which set the monoflop and thereby generate a positive voltage at a positive voltage output of the noninverting power amplifier, and provides a control voltage to the inverting power amplifier approximately at the same time that the monoflop is set to generate a negative voltage at a negative voltage output of the inverting power amplifier. The electromagnetic control element, which is connected to the positive voltage output of the noninverting power amplifier and the negative voltage output of the inverting power amplifier, is held in a particular first controlling state when voltage is present at both said positive voltage and negative voltage outputs, and is held in a particular second controlling state in the event of a decrease of at at least one of the two voltage outputs below a particular voltage value.

The electromagnetic control element preferably is an electromagnet. The invention causes the state of the gear shifting mechanism, which was engaged last, to be maintained automatically in the event of a decrease in or a failure of the electrical voltages communicated to the control element. Moreover, in the event of a short circuit in the electrical system, the invention prevents two or more gears of the gear shifting mechanism to be inadvertently engaged simultaneously. A further advantage of the invention consists that the clutches of gears consecutively engaged can be operated so as to slip simultaneously and that the extent (that is, the chronological coincidence of the slippage operations and the slippage torques of the clutches) of this "overlapping slippage operation" can be controlled or regulated with great operational safety as a function of the operating parameters.

The microcomputer interrupts the signal to the inverting power amplifier when a diagnostic system, which is integrated in the microcomputer, detects a defect in a component of the controlling or regulating system. An electrical response line extends from the positive voltage output of the noninverting power amplifier to the microcomputer and an electrical response line extends from the negative voltage output of the inverting power amplifier to the microcomputer. Each of these response lines contains a Schmitt trigger circuit so that the microcomputer does not provide any control pulses at its first output and/or its second output if the voltage in one and/or the other of the response lines deviates from a value specified by the microcomputer. The pulse processor interrupts, over the interrupt request line, the operation of the microcomputer, so that no control pulses are provided at its first output and/or second output, whenever the microcomputer does not set a count of the watchdog timer of associated with the pulse processor in a specified manner or when the pulse processor has a defect. The safety device further includes indicator means connected in parallel with the electromagnetic control element for indicating the electrical state of the electromagnetic control element.

BRIEF DESCRIPTION OF THE DRAWING

The single FIGURE of the drawing shows a wiring diagram of an inventive safety system of an electrical control and regulating system of a gear shifting mechanism.

DETAILED DESCRIPTION OF A PREFERRED EMBODIMENT

The essential components of the electrical monitoring system of the invention are:
a microcomputer 1,
a pulse processor 2 with an integrated watchdog timer and an integrated analog/digital convertor (A/D convertor),
a retriggerable monoflop 3,
a noninverting power amplifier 4,
an inverting power amplifier 5,
and two Schmitt trigger circuits 6 and 7.

The retriggerable monoflop 3, to the output 12 of which the noninverting power amplifier 4 is connected, is connected to an output 11 of the microcomputer 1. An electrical conductor 14 of an electromagnetic control element 15 is connected to the electrically positive voltage output 13 of the noninverting power amplifier 4. This control element 15 preferably is an electromagnetic valve. The inverting power amplifier 5, the negative voltage output of which is labeled 17, is connected to a second output 16 of the microcomputer 1. The electromagnetic control element 15 is also connected with a further electrical conductor 18 to this negative voltage output 17.

The microcomputer 1 is connected with address lines 21 and data lines 22, each for bidirectional flow of signals, to the pulse processor 2. The pulse processor 2 is connected with an interrupt request line 23 to an interrupt request connection 24 of the microcomputer 1. An electrical response line 25 contains the Schmitt trigger circuit 6 and connects the positive voltage output 13 with a further input 28 of the microcomputer 1. A further electrical response line 26 contains the Schmitt circuit 7 and connects the negative voltage output 17 with a different input 27 of the microcomputer 1. The microcomputer 1 can be connected with electrical signal lines 31 for bidirectional flow of signals with a further electrical control and regulating system of a gear shifting mechanism. The further electrical control and regulating system is not shown in the drawing, since it is not a part of the invention. Moreover, the microcomputer 1 is connected with bidirectional electrical conductors 32 with electrical control and measuring elements of an engine which elements are also not shown in the drawing, since they are not a part of the invention.

The microcomputer 1 contains one or several programs, by means of which a) the microcomputer 1 provides pulses, which set the monoflop 3 and, as a result, a positive electrical voltage is generated at the positive voltage output 13 of the noninverting power amplifier 4;

b) at the same time, the count of the watchdog time means of the pulse processor 2 is set, and c) approximately simultaneously with the setting of the monoflop 3, the microcomputer 1 outputs a signal to the inverting power amplifier 5, through which a negative electrical voltage is generated at the negative voltage output 17 of the inverting power amplifier 5.

Actual programming of microcomputer 1 to perform these functions is well within routine skill of workers in the art.

The electromagnetic control element 15, which is connected to the positive voltage output 13 and to the negative voltage output 17, is held in a particular first controlling state if the two voltages are present, and in a particular second controlling state in the event of a decrease in at least one of the two voltages.

Through the invention, three safety steps are provided:

First, when the microcomputer 1 provides no pulses to the monoflop 3, there is no positive voltage at the voltage output 13 of the inverting power amplifier 4.

Second, when the microcomputer 1, through a diagnostic system integrated within it, detects a defect in a component of the present safety device, or in an additional control or regulating system of the gear shifting mechanism or of an engine over one of the lines 31 or 32, the outputting of a signal at the output 16 of the microcomputer 1 to the inverting power amplifier 5 is interrupted by the program of the microcomputer, so that there is no negative voltage at the voltage output 17.

Third, if the microcomputer 1 does not set the count of the watchdog timer of the pulse processor 2 in a predetermined manner or if the pulse processor 2 itself has a defect, then the course of the program that has just run in the microcomputer 1 is interrupted by the interrupt line 23, and the microcomputer 1 causes the positive voltage at the voltage output 13 of the noninverting power amplifier 4 and/or the negative voltage at the voltage output 17 of the inverting amplifier 5 to be switched off.

By means of the response lines 25 and 26, the microcomputer 1 monitors whether the voltages, which are planned according to the program, are actually present at the outputs 13 and 17. As long as the system as a whole operates correctly, the voltages, which are required to maintain the electromagnetic control element 15 in a particular control position, are present at the voltage outputs 13 and 17.

The embodiment of a safety device described here can at the same time fulfill all the functions of an electrical control system or regulating system, if the microcomputer (1) contains a suitable program as is known. This safety device may, however, also be present in addition to a control and regulating system, where the control and regulating system also contains a microcomputer.

The invention enables an intelligent peripheral device and a microcomputer to monitor one another in the manner that an electromagnetic control element 15, particularly an electromagnetic valve of a gear shifting mechanism, is supplied with a monitored positive as well as with a monitored negative voltage.

The electrical indicator 40 shows the electrical voltage of the electromagnetic control element 15. The indicator 40 may be a light or an analog or digital voltage indicator.

While a specific embodiment has been disclosed, it will be readily apparent to those skilled in the art that numerous modifications and additions are possible without departing from the spirit of scope of the invention, which is only limited by the claims.

I claim:

1. A safety device for an electrical control or regulating system for a gear shifting mechanism, the system including at least one electomagnetic control element which controls a position of a shifting gear of the gear shifting mechanism and has first and second control states defining first and second positions of the shifting gear, the safety device comprising;

a microcomputer having first and second outputs and an interrupt request input;

a noninverting power amplifier having an input connected with the first output of the computer and a positive voltage output connected with the electromagnetic control element;

an inverting power amplifier having an input connected with the second output of the microcomputer and a negative voltage output connected with the electromagnetic control element;

a monostable flip-flop for connecting the first output of the microcomputer with the input of the noninverting power amplifier;

a pulse processor for processing data parallel to processing the data by the computer and including a watchdog timer means for monitoring functioning of the microcomputer; and address and data lines for connecting the pulse processor to the microcomputer and an interrupt request line for connecting the pulse processor to the interrupt request input of the microcomputer;

the microcomputer being programmed to provide voltage pulses for setting the flip-flop to generate a positive voltage at the positive voltage output of the noninverting power amplifier, and a control voltage to the inverting power amplifier to generate a negative voltage at the negative voltage output of the inverting power amplifier;

the electromagnetic control element being held in the first control state when a predetermined voltage is present at the positive voltage output of the noninverting power amplifier and at the negative voltage output of the inverting power amplifier, and being held in the second control state when the predetermined voltage decreases below a predetermined voltage value at at least one of the outputs.

2. A safety device as set forth in claim 1 wherein the computer is programmed to interrupt the signal from its second output to the inverting power amplifier upon detecting a defect in the control or regulating system.

3. A safety device as set forth in claim 2, further comprising two electrical response lines extending from the positive voltage output of the noninverting power amplifier to the microcomputer and from the negative voltage output of the inverting power amplifier to the microcomputer, respectively, each of the two electrical response lines including a Schmitt trigger circuit so that the microcomputer does not provide any control pulses at least at one of the first and second outputs thereof if voltage in a respective response line deviates from a predetermined value specified by the microcomputer.

4. A safety device as set forth in claim 4 wherein the pulse processor interrupts, over the interrupt request line, operation of the microcomputer when the microcomputer does not set a count of the watchdog timer means in a predetermined manner or when the pulse processor is defective, whereby no control pulses are provided at its outputs.

5. A safety device as set forth in claim 1 further comprising indicator means connected in parallel with the electromagnetic control element for indicating the control state.

* * * * *